United States Patent [19]

Potter

[11] Patent Number: 4,916,821
[45] Date of Patent: Apr. 17, 1990

[54] ELECTRONIC COMPASS AND OTHER MAGNETIC DEVICES

[76] Inventor: Bronson M. Potter, P.O. Box 332, Greenville, N.H. 03048

[21] Appl. No.: 164,091

[22] Filed: Mar. 4, 1988

[51] Int. Cl.⁴ .............................................. G01C 17/30
[52] U.S. Cl. ................................................... 33/362
[58] Field of Search ................. 33/361, 362; 324/251, 324/266, 244, 260

[56] References Cited

U.S. PATENT DOCUMENTS

| | | | |
|---|---|---|---|
| 2,334,593 | 11/1943 | Wyckoff | 175/183 |
| 2,434,324 | 1/1948 | Lehde | 33/362 |
| 2,474,693 | 6/1949 | Rowe | 175/183 |
| 3,197,880 | 8/1965 | Rice et al. | 33/361 |
| 3,316,768 | 5/1967 | Cook | 33/362 X |
| 3,425,648 | 2/1969 | Wipff et al. | 33/361 X |
| 3,678,593 | 7/1972 | Baket et al. | 33/355 |
| 3,786,571 | 1/1974 | Kelman . | |
| 4,075,627 | 2/1978 | Pariza . | |
| 4,104,803 | 8/1978 | Hoeppel | 33/361 |
| 4,139,950 | 2/1979 | Zuvela | 33/361 |
| 4,503,621 | 3/1985 | Fowler | 33/361 |
| 4,587,509 | 5/1986 | Pitt et al. | 324/260 |
| 4,692,703 | 9/1987 | Extance et al. | 324/251 |

OTHER PUBLICATIONS

Roland Pease, Nature, Jul. 1987, vol. 328, p. 12.
David Arnold, The Boston Globe, "The Fluxgate, a Compass That Can Do Much More Than Point To North, Getting Cheaper, More Popular", Jun. 1, 1987, p. 41.

Primary Examiner—William A. Cuchlinski, Jr.
Assistant Examiner—Christopher W. Fulton
Attorney, Agent, or Firm—Fish & Richardson

[57] ABSTRACT

Concentrated lines of flux through two loosely mounted magnetically contacting reeds are intermittently mechanically interrupted by breaking the contact infinitesimally, thus deriving a near-maximum generated EMF in a coil surrounding the contact. A piezo transducer driven in feedback arrangement by an oscillator provides an energy-efficient drive for a hammer that irregularly strikes one of the reeds. A compass based on this noncoherent modulation of a flux path is shown and other devices based upon this principle are mentioned.

14 Claims, 2 Drawing Sheets

ELECTRONIC COMPASS AND OTHER MAGNETIC DEVICES

BACKGROUND

Proposals for an electronic compass, to avoid drawbacks of the conventional needle compass, have been known for many years but have seen little practical application.

The present invention is believed to provide an electronic compass that, because it is simple, inexpensive and reliable, should find widespread application. The invention also provides, more generally, a sensitive, inexpensive approach to detection or interaction with magnetic flux.

SUMMARY OF THE INVENTION

According to one aspect of the invention, a flux concentrator made of two similar reeds is vibrated to break a closed flux path infinitesimally and at an irregular rate to produce an irregular modulation of the flux that can be readily detected by a pickup coil playing to earphones or a simple amplifier and loudspeaker.

In the prior art of electronic compasses with vibrating flux concentrators, it has been suggested that the vibrating element should be driven near or at its natural mechanical frequency. I have discovered, for present purposes, the converse is true. An extremely inexpensive and accurate device can be achieved using a flux concentrator that is mechanically tapped so as to vibrate non-coherently. The term "non-coherent" as used here is intended to imply that energy is dispersed over numerous mechanical frequencies, a condition that can be called "noisy". While the term is not intended to exclude energy present at the fundamental frequency, or its simple harmonics, it does imply that much of the energy is spread over other frequencies so as to give the overall effect of noise to the ear.

According to one aspect of my invention I have, in a sense, discovered that "cheaper is better" for a class of products which previously may have been thought to require precision. I can use inexpensive, loosely fitted parts made without close tolerances and inexpensive entertainment electronic components to achieve the desired effect.

Another aspect of the invention is a sonic device for detecting the boundary or null regions of a magnetic field, by generating sonic noise from ambient flux, and employing the ear to discriminate between presence and absence of such noise. Leakage currents from the drive of the flux concentrator are a clear tone, amply swamped by sonic noise.

These and numerous other advantageous features are employed in the achievement of the preferred compass.

Another aspect of the invention, more generally, is that of breaking a closed magnetic circuit non-coherently so as to efficiently generate electronic noise in the infinitesimal temporary gaps thus formed and lost, which may find use not only in compasses and magnetometers, but also in certain classes of amplifiers and current generators where a vibratory motion of a flux concentrator may be employed.

Still another aspect of the invention is the use of simple piezoelectric or electromagnetic drive systems for the excitation of the sensing elements.

Various features of this invention are given in the claims which are incorporated here by reference.

DESCRIPTION OF PREFERRED EMBODIMENTS

The preferred embodiments will be described with reference to the figures.

Figure 1:
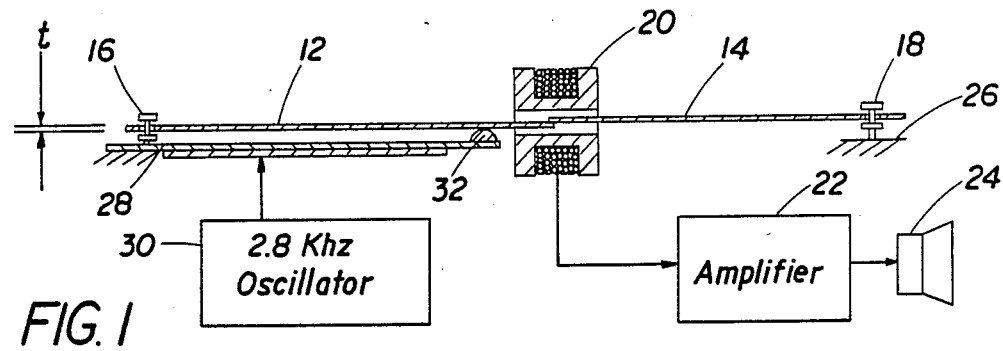
FIG. 1 is a side view of an embodiment of an electronic compass.
Figure 2:
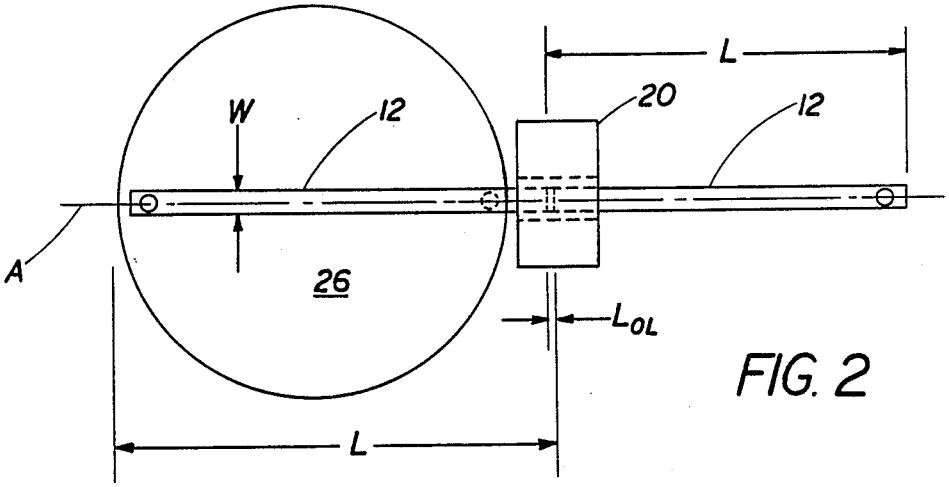
FIG. 2 is a plan view of the embodiment of FIG. 1.

Referring now to FIGS. 1 and 2, two elongated flux-concentrating reeds 12, 14, are aligned along axis A in a slightly overlapping relationship. Each reed is formed of magnetic metal (M5 Silicon Steel) of length, L, $1\frac{1}{4}$ inch; width, W, $\frac{1}{8}$ inch; and thickness, t, 0.010 inch. The length of overlap, $L_{OL}$, is 1/64 inch.

The elements are loosely mounted on posts 16,18 at their remote ends in a manner which biases them into light contact in the region of overlap when the compass is not energized.

A pickup coil 20 surrounds the region of overlap. It is connected, via amplifier 22, to speaker 24. The interior of the coil restrains the reeds from lateral motion.

Post 18, mounting the end of reed 14, is secured to fixed frame 26 while post 16, mounting the end of reed 16, is secured to the margin of piezoelectric transducer 28, which in turn is secured to the frame.

In the operating breadboard design, which these figures represent, the piezoelectric transducer and 2.8 Khz oscillator 30 are taken from an inexpensive piezoelectric alerting device (Sonalert ®, SNP 4 from P. R. Mallory & Son). The pickup coil 20 is the 1000 ohm winding of an output transformer from an inexpensive transistor radio, with armature removed. The amplifier 22 and speaker arrangement, 24, are taken from a portable cassette player (Model 892 from Lennox Sound).

Figure 3:
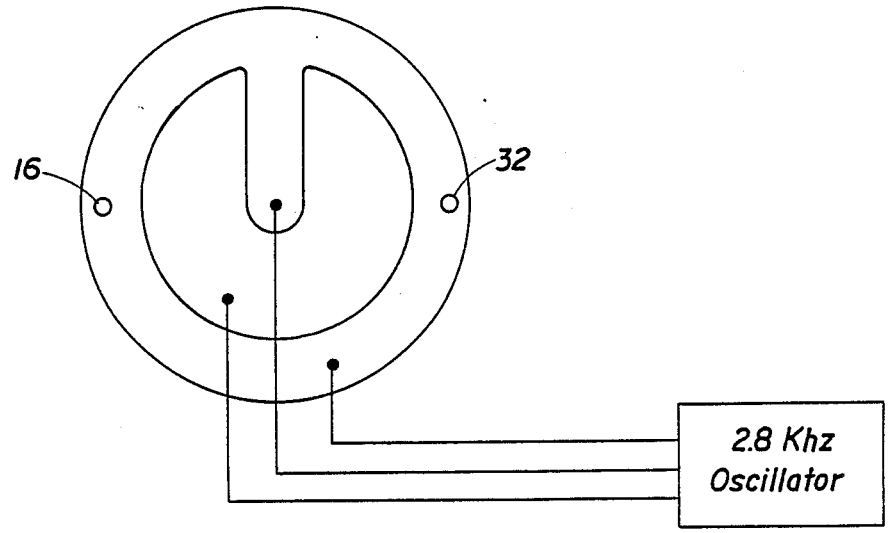
FIG. 3 is a plan view of the piezoelectric transducer employed in the embodiment of FIGS. 1 and 2.

Referring to FIG. 3, the piezoelectric crystal is of disc form with electrodes provided to enable excitation and feedback to the oscillator. In known manner, the piezoelectric disc and a brass substrate to which it is secured, are caused to vibrate between concave and convex, dished shapes, with excursions in the direction normal to its plane. A hammer 32 is formed on the piezoelectric transducer in a region of greatest excursion, arranged to contact the underside of reed 12 adjacent the region of overlap, to repeatedly strike the reed 12. Whereas the piezoelectric transducer and feedback controlled oscillator per se form a highly resonant electro-mechanical system, the loosely mounted reeds form a relatively non-resonant, untuned system, comparable to cymbals, say.

Because of this construction the transducer taps the reed intermittently and irregularly, because reed 12 continually changes its position relative to the transducer at the time of contact with the hammer. The second reed 14 is jangled through its loose contact with the first reed, its loose constraints preventing it from damping the first reed excessively as well as allowing it to participate in the disorderly motion.

The reeds, thus excited, can be heard to make a slight tinny sound and the intermittent contact between them makes a slight rustling sound. If the reeds are in a magnetic path, the output of the coil, played to the speaker, sounds roughly like noise.

When a very slight flux is present, noise from the loud speaker is heard, but when no flux is present, the noise disappears. Thy system is thought to be extraordinary (for its class) in detecting small magnetic fields, and is particularly notable for finding the east-west null in the earth's magnetic field by simply scanning the device in a horizontal arc. Discrimination between east and west is readily achieved by sensing the rise of the null towards compass north or the sinking to the south.

As a possible explanation of the sensitivity that has been observed, it is thought that the wide distribution of frequencies so reduce the energy at any one frequency that magnetostrictive effects are abated. Also conversion of the frequency of the external mechanical force to alien noise energy reduces input and output coupling, to make discrimination by the ear easy. Noise is peculiarly advantageous for nulling by ear, and it can be pulsed 3 times a second, say, to fight wind noise.

Figure 5:
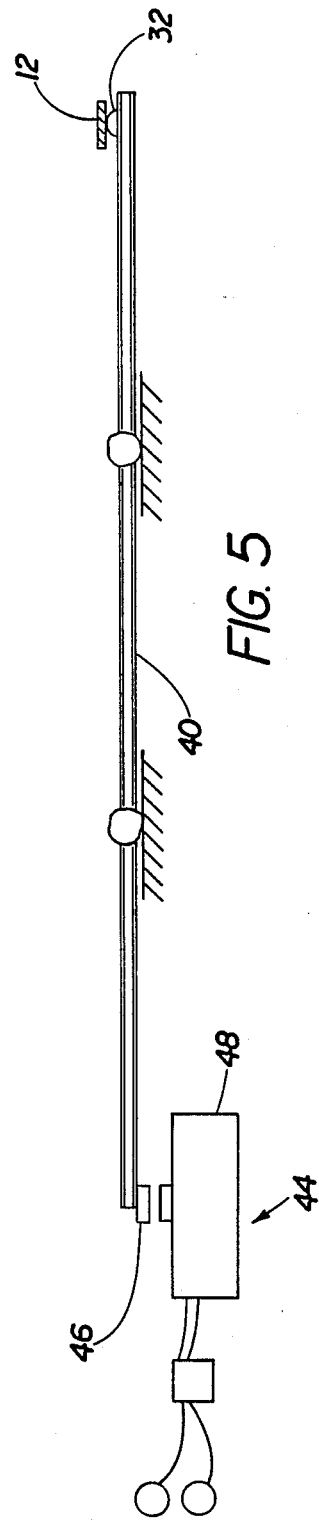
FIG. 5 is a side view, partly in section, of another embodiment which has an electromagnetic driver.
Figure 4:
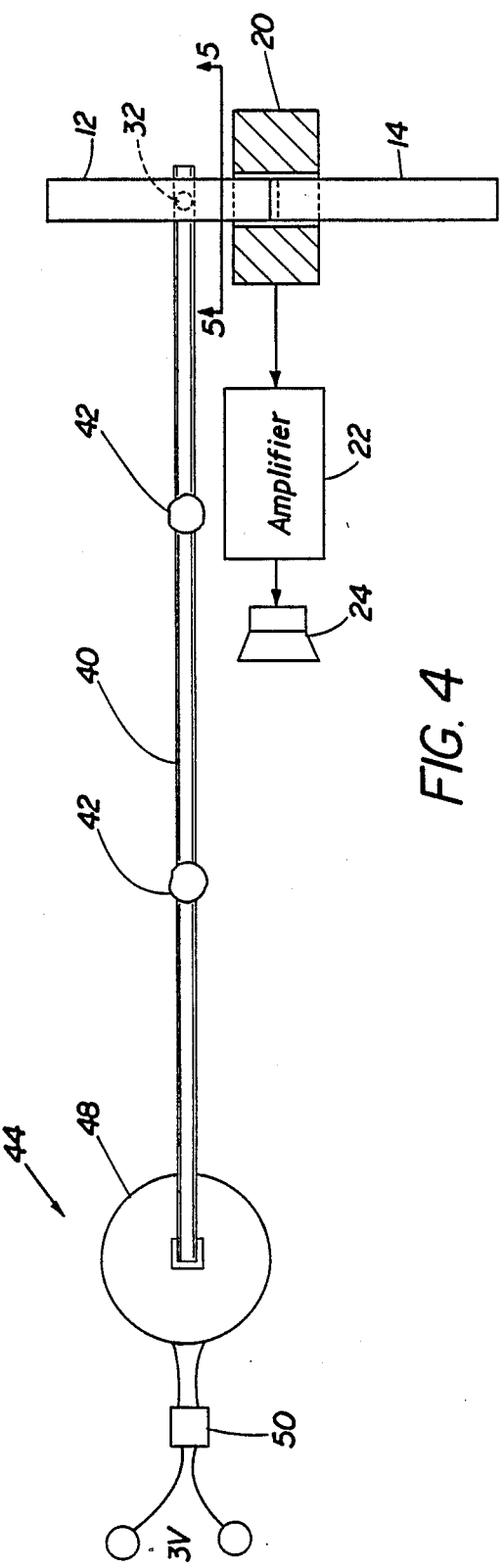
FIG. 4 is a plan view.

Referring to FIGS. 4 and 5, the reed 12 in this case is driven by an elongated bar 40 mounted at nodes 42 to vibrate in the manner of a xylophone bar. Hammer 32 at one end of the bar strikes the loosely mounted reed 12 in the manner previously described, while the opposite end of the bar is driven by an electromagnetic drive system 44. For this purpose magnet 46 is carried by the bar, arranged to interact with electromagnet 48 which is driven by a control chip 50 powered e.g. by 3 v. battery. The bar, for instance, may be ⅛ inch diameter brass tubing, 7 inches in length, adapted to resonate at 100 Hz. The electromagnet drive system may be taken from a STAR MMB Buzzer sold by Meshna of Lynn, Massachusetts, the pickup coil may be a telephone pickup and the reeds may each be 1½ inch by ¼ inch by 0.010 inch M5 silicon steel.

In this design the pickup, being quite remote from the drive, does not respond substantially to stray oscillating energy of the drive.

Other embodiments for delivering noisy agitation to a flux path, and in particular to a gap of a flux path, are within the spirit and scope of the claims.

What is claimed is:

1. A device for detecting the presence or absence of magnetic flux in a chosen direction of the type comprises a flux-concentrating element adapted to be disposed in a region of interest, an excitation means for exciting vibrations in said element and a pickup means arranged to detect change in magnetic flux associated with said element, said flux-concentrating element being mounted to make and break mechanical contact with a second flux-concentrating element in the manner that a flux path of greater or lesser flux capacity occurs depending upon the relationship of the flux concentrating elements to each other, said excitation means comprising means to cause motion of one of said elements relative to the other to cause rapid, repeated making and breaking of mechanical contact between said elements and said pickup means adapted to produce a response to the attendant change of flux associated with said repeatedly contacting elements, the absence of such response denoting the absence of magnetic flux extending in said direction, and said flux-concentrating elements and said excitation means being cooperatively related to produce irregular modulation of the spacial relationship between said flux-concentrating elements.

2. The device of claim 1 wherein at least one of said flux-concentrating elements is loosely mounted to enable it to move in a disorderly fashion.

3. A device for detecting the presence or absence of magnetic flux in a chosen direction of the type comprising a flux-concentrating element adapted to be disposed in a region of interest, an excitation means for exciting vibrations in said element, said excitation means comprising a hammer adapted to rapidly strike at least one of said flux concentrating elements, and a pickup means arranged to detect change in magnetic flux associated with said element, said flux-concentrating element being mounted to make and break mechanical contact with a second flux-concentrating element in the manner that a flux path of greater or lesser flux capacity occurs depending upon the relationship of the flux concentrating elements to each other, said excitation means comprising means to cause motion of one of said elements relative to the other to cause rapid, repeated making and breaking of mechanical contact between said elements and said pickup means adapted to produce a response to the attendant change of flux associated with said repeatedly contacting elements, the absence of such response denoting the absence of magnetic flux extending in said direction.

4. The device of claim 3 wherein at least one of said elements is elongated and is mounted at a region near an end remote from the region of its contact with the other element.

5. A device for detecting the presence or absence of magnetic flux in a chosen direction of the type comprising a flux-concentrating element adapted to be disposed in a region of interest, an excitation means for exciting vibrations in said element and a pickup means arranged to detect change in magnetic flux associated with said element, said flux-concentrating element being mounted to make and break mechanical contact with a second flux-concentrating element in the manner that a flux path of greater or lesser flux capacity occurs depending upon the relationship of the flux concentrating elements to each other, said excitation means comprising means to cause motion of one of said elements relative to the other to cause rapid, repeated making and breaking of mechanical contact between said elements and said pickup means adapted to produce a response to the attendant change of flux associated with said repeatedly contacting elements, the absence of such response denoting the absence of magnetic flux extending in said direction, said excitation means including an oscillator which oscillates at a characteristic frequency unsynchronized with the motion of said flux concentrating elements, the characteristic oscillation of said oscillator being at a substantially regular frequency and the making and breaking of contact between said flux concentrating elements being substantially irregular.

6. The device of claim 5 wherein said pickup means picks up a signal having as a first component of said characteristic regular frequency of said excitation means and as a second component, an irregular coherent signal related to flux changes during making and breaking of said contact, an output signal from said pickup means consisting of said first component without said second component denoting the absence of flux in said given direction.

7. An electronic compass constructed according to claim 1, 2, 3, 4, 5 or 6, said flux concentrating element being elongated and movable in a sweeping motion through a range of directions, the absence of said response denoting that said flux concentrating element is aligned in the East-West direction relative to the earth's magnetic field.

8. The device of claim 1, 3 or 5 wherein said excitation means comprises an electrically driven piezo crystal.

9. The device of claim 1, 3 or 5 wherein said excitation means comprises an electromagnet.

10. In a device incorporating a flux-concentrating means adapted to be mechanically excited by an excitation means in the presence of magnetic flux for modulating the flux path, the improvement wherein said mechanical excitation means and said flux-concentrating means are so related that said flux-concentrating means is excited in a an irregular manner to produce irregular modulation of flux in the flux path, and a sensor responsive to said modulation to produce a noise signal when flux is present in the path.

11. The device of claim 10 in which excitation of said flux-concentrating means is adapted to modulate the size of a gap in a flux path in an irregular manner.

12. The device of claim 10 or 11 wherein said flux-concentrating means comprises at least one reed of magnetic material.

13. The device of claim 12 wherein said flux concentrating means comprises a pair of reeds of magnetic material that are loosely mounted and biased into light overlapping contact with each other whereby said excitation causes said reeds to make and break contact with each other as the size of said gap is modulated.

14. The device of claim 12 wherein said excitation means is driven in a regular manner and said reed is mounted in a decoupled manner relative to said excitation means such that it moves in irregular motion when driven.

* * * * *